United States Patent [19]

Troester et al.

[11] Patent Number: 5,839,280

[45] Date of Patent: Nov. 24, 1998

[54] FLUID-MECHANICAL ACTUATOR HAVING A PISTON WITH TWO SECTIONS

[75] Inventors: Harry Troester, Tamm; Detelf Felder; Michael Duwe, both of Berlin; Friedhelm Buerger, Heiligenhaus, all of Germany

[73] Assignees: Daimler-Benz Aktiengesllschaft; Berger, Boehringer & Partner, GmbH, both of Germany

[21] Appl. No.: 901,067

[22] Filed: Jul. 28, 1997

[30] Foreign Application Priority Data

Jul. 26, 1996 [DE] Germany .......................... 196 30 218.8

[51] Int. Cl.⁶ ...................................................... B60T 13/00
[52] U.S. Cl. .............................................. 60/547.1; 60/582
[58] Field of Search .................................... 60/547.1, 582, 60/594

[56] References Cited

U.S. PATENT DOCUMENTS

| | | | |
|---|---|---|---|
| 4,034,566 | 7/1977 | Suketomo et al. | 60/582 X |
| 4,087,972 | 5/1978 | Scheffel . | |
| 4,703,978 | 11/1987 | Belart et al. | 60/582 X |
| 4,783,965 | 11/1988 | Kervagoret | 60/582 X |
| 5,065,573 | 11/1991 | Nomura et al. | 60/582 X |

FOREIGN PATENT DOCUMENTS

| | | |
|---|---|---|
| 43 10 061 A1 | 9/1994 | Germany . |
| 44 01 524 A1 | 8/1995 | Germany . |
| 2 003 564 | 3/1979 | United Kingdom . |
| WO 95/19901 | 7/1995 | WIPO . |

OTHER PUBLICATIONS

Automotive Handbook, Robert Bosch GmbH, 21st Edition, VDI Publishing House, Düsseldorf, 1991, Table 1 "Cylinder construction shapes", p. 733.

*Primary Examiner*—Hoang Nguyen
*Attorney, Agent, or Firm*—Evenson, McKeown, Edwards & Lenahan, P.L.L.C.

[57] ABSTRACT

A fluid-mechanical actuator has a cylinder housing and a piston which is guided movably in the cylinder housing. A working chamber can be filled with a fluid and is bounded by the cylinder housing and the piston. By filling the working chamber with fluid, the piston can be displaced in the cylinder housing counter to the effect of a restoring spring and can transmit a force via a working linkage which is arranged on the side of the piston remote from the working chamber. The fluid-mechanical actuator provides both fluid actuation and mechanical actuation. The piston has two sections, a ring and a bushing which is guided out of the working chamber. The working linkage has a supporting ring whose diameter is larger than the inside diameter of the bushing. Thereby a force can be transmitted to the supporting ring by the piston. An actuating linkage is guided in the bushing and is movable relative to the working linkage. A force can thus be introduced into the working linkage without transmitting a force to the piston.

11 Claims, 1 Drawing Sheet

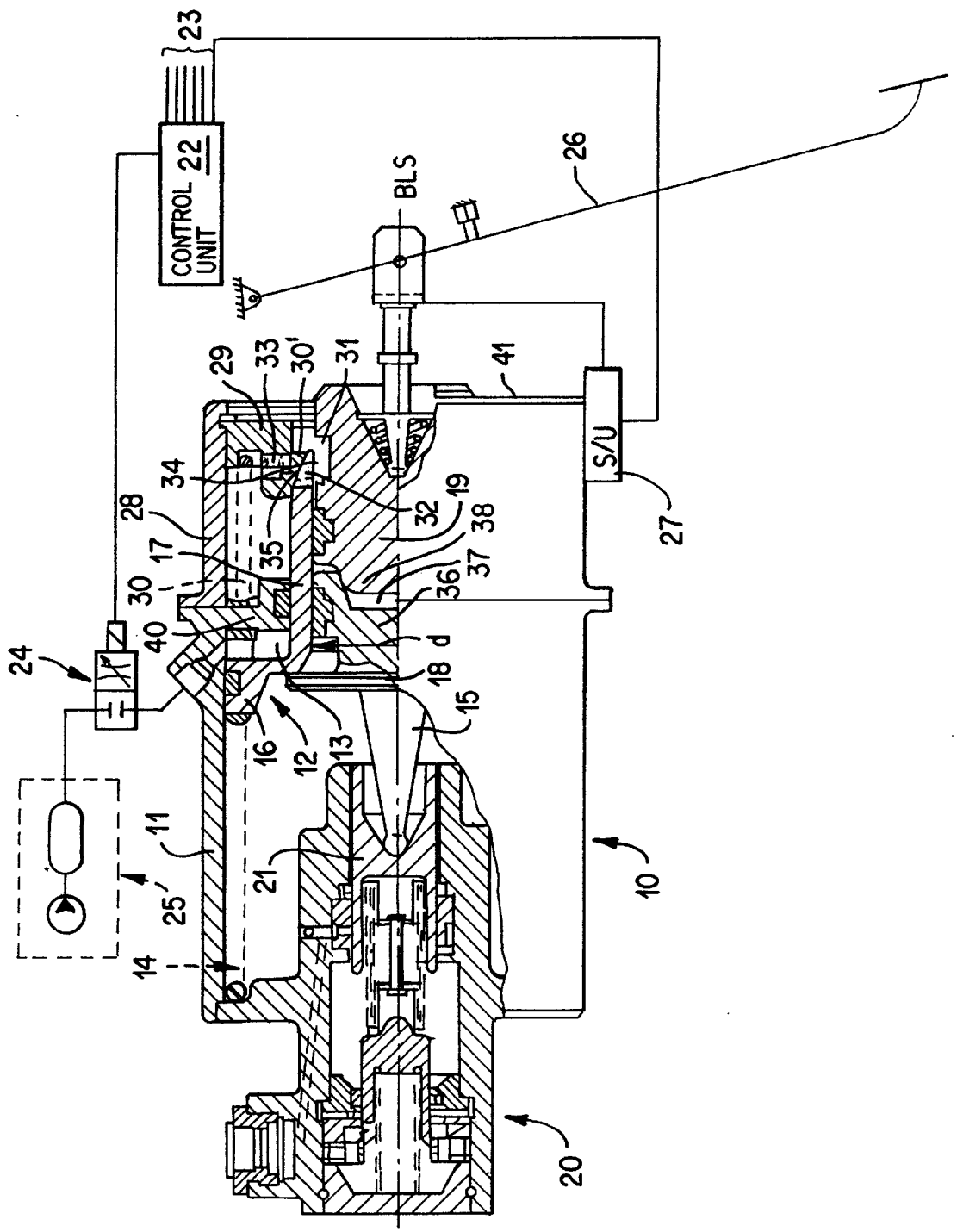

FLUID-MECHANICAL ACTUATOR HAVING A PISTON WITH TWO SECTIONS

BACKGROUND AND SUMMARY OF THE INVENTION

This application claims the priority of 196 30 218.8, the disclosure of which is expressly incorporated by reference herein.

The present invention relates to a fluid-mechanical actuator having a cylinder housing and a piston which is guided movably in the cylinder housing, a working chamber which can be filled with a fluid being bounded by the cylinder housing and the piston, the piston being displaceable in the cylinder housing counter to the effect of a restoring spring by filling the working chamber with fluid, and a working linkage being arranged on the side of the piston remote from the working chamber, to which linkage a force can be transmitted by the piston.

A fluid-mechanical actuator has been described in, for example, "Automotive Handbook", Robert Bosch GmbH, 21st Edition, VDI Publishing House, Düsseldorf, 1991, Table 1 "Cylinder construction shapes", page 733. In an actuator of this type, the actuator, in the event of a failure of the fluid supply, remains in the position just assumed or, if the working chamber is pressureless, drops back into the unactuated position. Emergency actuation of the actuator is impossible.

Another known fluid-mechanical actuator is described in DE 43 10 061, in which the actuator is integrated in the master brake cylinder of a vehicle brake. The filling of the working chamber takes place as a function of the braking force applied by the driver and of brake pressure control systems.

DE 44 01 524 A1 describes the guidance of an actuating linkage through the working chamber of a fluid-mechanical actuator in a bushing through the working chamber of the actuator. Force introduction into the linkage without any force acting on the piston of the working chamber can only take place within a predetermined, small freedom of movement.

In a large number of systems, however, the possibility of purely mechanical actuation is prescribed for safety reasons. This is the situation, for example, in brake systems of passenger vehicles, in which the system must be capable of generating pressure in the master brake cylinder at any time merely by actuating the brake pedal without auxiliary forces.

It is therefore an object of the present invention to provide a fluid-mechanical actuator capable of both fluid actuation and mechanical actuation, with the mechanical actuation being possible at any time irrespective of the current state of the fluid actuation. Moreover, the actuator should take up the smallest possible construction space, i.e. occupy the smallest real estate.

The foregoing object has been achieved according to the present invention by providing that the piston has two sections, the first section being a ring which terminates the working chamber and the second section being a bush, the bush running coaxially with the cylinder housing and being guided out of the cylinder housing in a fluid-tight manner on the side of the working chamber, in that the working linkage has a supporting ring whose diameter is larger than the inside diameter of the bush, so that a force can be transmitted to the supporting ring by the piston, and in that an actuating linkage is guided in the bush, which actuating linkage is movable relative to the working linkage, and by means of which a force can be introduced into the working linkage without a force being transmitted to the piston in the process.

According to the present invention, the piston of the actuator comprises a ring which terminates the working chamber in a fluid-tight manner and a bushing arranged coaxially with the cylinder housing and being guided out of the cylinder housing in a fluid-tight manner on the side of the working chamber. The pressurized surface of the piston is thus reduced to the surface of the ring. Although the ensuing reduction in the force generated at a prescribed pressure has to be compensated by higher pressures in the working chamber, an actuating linkage can be guided through the bushing at the same time to transmit a force to the working linkage.

The working linkage has a supporting ring whose diameter is larger than the inside diameter of the bushing. If a pressure is generated in the working chamber, the piston rests against the supporting ring, and the force which acts on the piston is passed on to the working linkage via the supporting ring. Because it is necessary to generate higher pressures in the working chamber in comparison with a conventional actuator, the actuator is often configured as a hydraulic actuator.

A significant advantage of the present invention arises from the fact that, when the working chamber is acted upon by a pressure which was introduced irrespective of any actuation of the actuating element connected to the actuating linkage, the actuating element and the actuating linkage connected thereto remain in their unactuated rest position. This is accomplished because the actuating linkage is guided in the bushing so as to be movable relative to the working linkage. The actuating path of the working linkage (that is to say, the stroke of the piston in the working cylinder) is independent of the path of the actuating linkage. The required length of the bushing is determined from the maximum stroke of the piston in the working cylinder.

According to another aspect of the present invention, the working linkage is connected to the trunk piston of the master brake cylinder of a vehicle. Here, the fluid actuator replaces the conventional servo brake which, in contrast to the present invention, has a continuous mechanical connection between the brake pedal and the trunk piston of the master brake cylinder, so that the actuating linkage and the working linkage are separate from and movable relative to one another.

According to one embodiment of the present invention, the pressure with which the working chamber is acted upon is controlled by a control unit by a desired pressure being determined from input variables. The control unit actuates a control valve which is arranged in the fluid connection between the pressure source and the working cylinder.

The trunk piston of the master brake cylinder can be actuated by the fluid-mechanical actuator. In this embodiment, the actuation of the brake pedal by the driver is registered by a sensor and is fed to the control unit. The pressure in the working chamber is determined as a function of the registered actuation of the brake pedal by the driver.

An additional hollow tube can also be arranged on the actuating-linkage side of the cylinder housing of the actuator. A guide ring is arranged so as to be guided movably in the hollow tube, and is displaceable counter to the effect of a spring in the direction of the working cylinder by introducing an actuating force into the actuating linkage. This device has the advantage that, even if the actuating linkage is not resting on the working linkage, a force counteracts the actuation of the actuating linkage via the actuating means. If the actuator is used to actuate the trunk piston of a master brake cylinder, when a brake pressure has been built up irrespective of the actuation of the brake pedal due to the fact that the working chamber has been acted upon by a pressure, a force which counteracts the brake pedal actuating force is introduced into the actuating linkage configured as a brake linkage.

A simulation device is thus obtained, which simulates to the driver the build-up of a pressure in the wheel brakes without a brake pressure which actually corresponds to this actuation being generated in the wheel brakes by the wheel brake cylinder. This results from a brake pressure appropriate to the current driving situation. having already been generated in the master brake cylinder via the actuator by way of the control unit based on the signals fed thereto. The brake pressure generated in the master brake cylinder may be substantially greater than the brake pressure resulting from the present actuation of the brake pedal. A force is transmitted by the actuating linkage to the working linkage only when the force introduced into the actuating linkage is greater than the force transmitted to the working linkage by the piston and the force acting on the actuating linkage because of the spring.

According to yet another feature of the present invention, the non-positive connection between the guide ring and the actuating linkage is switchable. The non-positive connection is released when the actuating force introduced into the actuating linkage is smaller than a value determined from a prescribed relation from the pressure in the working chamber. If the force introduced into the actuating linkage is greater than the value determined from the current pressure in the working chamber by way of the prescribed relation, the non-positive connection between the guide ring and the actuating linkage is released. Thus no force counteracting the actuating force is introduced into the actuating linkage by the spring which acts on the guide ring. Thereby, the actuating force is the minimum force which is introduced into the working linkage as a minimum. No unnecessary force counteracts the emergency actuation and, for this case, the actuator efficiency is increased.

This feature has the further advantage that the spring which acts on the guide ring only acts on the actuating linkage when a force is introduced into the working linkage by the piston. The force is smaller than the force which results from a fixed relation from the actuating force introduced into the actuating linkage. The fixed relation results essentially from the geometry of the bushing, the relation fixed in the control unit between the actuating force registered and the force-path characteristic of the spring which acts on the guide ring.

Another advantageous feature of the present invention resides in the non-positive connection between the guide ring and the actuating linkage being automatically switchable. This has the advantage, in particular, that greater mechanical force transmissions can be provided for the release plane. For the release plane, the force required by the foot for emergency braking is thus reduced.

Moreover, the release or production of the non-positive connection between the actuating linkage and the guide ring is automatically switchable, in particular when using the ensuing relative movement between the actuating linkage, the bushing and the guide ring. Thereby, the connection is produced by mechanical means, so that even the highest safety requirements placed on the failsafe nature of the system are fully met.

The use of an actuator according to the present invention in a passenger vehicle is suitable because it enables a brake pressure to be generated in the master brake cylinder irrespective of the actuation of the brake pedal, that is to say so-called active brake interventions to be carried out, for example to prevent a vehicle skidding. This brake pressure serves as a pressure source for brake pressure to be generated in the wheel brake cylinders. Thereby, the pressure in the wheel brake cylinders can, if appropriate, even be effected for each wheel brake cylinder individually by controlled actuation of the ABS valves. These ABS valves are individual or valve pairs assigned to some of the wheel brake cylinders, and the pressure build-up in the assigned wheel brake cylinder or cylinders is bounded by one valve of the valve pair. That is, the pressure supply coming from the master brake cylinder (main brake line) is blocked, while the venting of the wheel brake cylinder or cylinders can be switched by the other valve; the brake pressure in the wheel brake cylinder or cylinders can be reduced by opening this valve.

BRIEF DESCRIPTION OF THE DRAWING

Other objects, advantages and novel features of the present invention will become apparent from the following detailed description of the invention when considered in conjunction with the accompanying drawing wherein the sole figure is a partial schematic, cross-sectional side view of an actuator according to the present invention used for actuating, for example, the trunk piston of a master brake cylinder of a vehicle but with the understanding that the specific applications of the actuator and of the actuated element does not have any limiting effect on the construction of the actuator according to the invention.

DETAILED DESCRIPTION OF THE DRAWINGS

A signal from sensor 27 is fed to a control unit 22 which may also be integrated in other control devices. The sensor 27 registers the path of a brake pedal 26 travelled owing to driver actuation of the brake pedal 26. As an alternative to registering the pedal travel, the actuating force itself can also be measured. Further input variables 23 can be fed to the control unit, for example via a data bus. Based on the signals which are fed to the control unit 22, a desired value for the pressure in a working chamber 13 of an actuator 10 is determined in the controller. This pressure is set in the working chamber 13 by the fact that a valve 24 is actuated accordingly by the control unit 22. The valve 24 switches the fluid connection between the working chamber 13 of the actuator 10 and a pressure source 25.

The working chamber 13 is bounded by the cylinder housing 11 of the actuator 10 and the piston 12. The piston 12 can be displaced in the cylinder housing 11 counter to the effect of the restoring spring 14, with the restoring spring 14 counteracting any increase in the volume of the working chamber 13. At an end of the cylinder housing 11 remote from the working chamber 13, a working linkage 15 of the actuator 10 is connected to the trunk piston 21 of the master brake cylinder 20.

If the piston 12 is displaced in the direction of the master brake cylinder 20 due to a pressure acting on the working chamber 13, the piston 12 comes to rest against a supporting ring 18 of the working linkage 15, which ring 18 has a diameter larger than the inside diameter d of the bushing 17, and introduces the force acting thereon into the working linkage 15. The latter displaces the trunk piston 21 in the master brake cylinder 20 until the pressure in the chambers of the master brake cylinder 20 is so high that the force acting on the trunk piston 21 corresponds to the force introduced into the trunk piston 21.

In order to achieve the braking forces necessary for emergency braking, the pressure in the working chamber 13 must have values amounting to an order of magnitude of 250 bar as a function of the surface area of the piston 12. In order to ensure rapid actuation of the actuator 10, a pressure source 25 of a suitable delivery volume must be provided. A hydraulic oil selected to meet these requirements is then typically used as the working fluid.

In order also to make mechanical actuation possible, the piston 12 has two sections, namely a ring 16 which serves as a termination of the working chamber 13 in the direction of piston movement and the bushing 17 which runs coaxially with the cylinder housing 11. The bushing 17 is guided in a fluid-tight manner out of an actuating-linkage side termination 40 of the cylinder housing 11. A receiving bolt 36 molded onto the working linkage 15 is guided so as to be displaceable in the bushing 17.

The actuating linkage 19 with its molded-on centering cone 38 is likewise guided so as to be displaceable in the bushing 17. The centering cone 38 is configured to correspond inversely to the centering depression 37 in the receiving bolt 36. For the transmission of force between the actuating linkage 19 and the working linkage 15, the linkages rest against one another. The transmission of force between the two linkages 19, 15 takes place via the side walls of the centering cone 38 resting against the side walls of the centering depression 37.

A hollow tube 28 which surrounds the part of the bushing 17 which protrudes out of the actuator is arranged on the actuator 10 on the working-chamber side and coaxially with the cylinder housing 11. A guide ring 29 is arranged in the hollow tube 28 so as to be displaceable counter to the effect of the spring 30 in the direction of the working chamber. The hollow tube 28 is terminated by the housing cover 41 out of which the actuating linkage is guided.

In the pressureless (i.e., rest) state of the working chamber 13, the bushing 17 protrudes so far into the hollow tube 28 that it enters the region of the guide ring 29. A control wedge 32 formed on the bushing 17 pushes a pawl 30 at the control cam 35 formed thereon into the receptacle 33 formed in the guide ring 29 counter to the effect of a catch spring 34. The pawl 30 then no longer protrudes into a catch groove 31 formed on the actuating linkage 19, so that there is no non-positive connection between the guide ring 29 and the actuating linkage 19. Only when pressure is introduced into the working chamber 13 and no corresponding actuation of the brake pedal 26 takes place is the bushing 17 retracted into the working chamber (movement of the piston) so that pawl 30 no longer acts on the control wedge 32 and the pawl 30 therefore protrudes into the catch groove 31. Thereby, a non-positive connection is produced between the actuating linkage 19 and the guide ring 29. At the same time, there is no contact between the centering cone 38 and the centering depression 37.

If the brake pedal 26 is actuated during this non-positive connection, the actuating linkage 19 is displaced in the direction of the working chamber 13. Because of the non-positive connection, the guide ring 29 is carried along, so that the spring 30 counteracts this movement. The driver of the vehicle thus experiences a progressive pedal resistance during the actuation of the brake without this pedal resistance being attributed to a build-up of brake pressure. The pedal travel is registered by the sensor 27, and the pressure in the working chamber 13 is determined such that there is a specific relation between the pedal travel and the actuating force and between the pedal travel and the braking force.

In normal operation, the fluid-mechanical actuator thus simulates a power-assisted brake, such as is currently customary in passenger cars. In that normal operation, there is thus a prescribed relation, determined by the program of the control unit 22, between the pedal, travel and the pressure in the working chamber 13, i.e. the braking force.

An even higher pressure is only built up in the working chamber 13 in the event of active brake interventions (traction control function, automatic brake actuation, etc.). Also in this situation, the non-positive connection between the actuating linkage 19 and the guide ring 29 remains intact. Moreover, the force-path relation of the driver's brake pedal 26 results from the spring 30, so that the driver continues his or her customary behavior in brake actuation. The brake pressure control by generating a (higher) pressure cannot be felt on the brake pedal 26.

Only when, due to a failure or malfunction, the pressure in the working chamber 13 is lower than a pressure which results from the position of the brake pedal does the guide edge reach the bushing 17 so that the pawl 30 is removed from the catch groove 31 by the control wedge 32 via the control cam 35. At this time, the centering cone 38 rests against the centering depression 37. A non-positive connection between the working linkage 15 and the actuating linkage 19 is thereby produced. Also, the non-positive connection between the guide ring 29 and the actuating linkage 19 is interrupted. The guide bushing 17 is pushed back into its starting position by the spring 30. The force which acts on the actuating linkage 19 via the brake pedal 26 is introduced into the working linkage 15. Although there is no longer the previous relation between the pedal travel and the pedal force, the driver thus notices the failure of the system and can continue to generate a brake pressure in the master brake cylinder 20 and in the individual wheel brakes via the mechanical connection.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A fluid-mechanical actuator, comprising a cylinder housing; a piston guided movably in the cylinder housing; a working chamber which can be filled with a fluid being bounded by the cylinder housing and the piston; a restoring spring arranged such that the piston is displaceable in the cylinder housing counter to the effect of the restoring spring by filling the working chamber with fluid; a working linkage arranged on a side of the piston remote from the working chamber such that a force can be transmitted by the piston to the working linkage, wherein the piston has a first section comprising a ring which terminates the working chamber and a second section comprising a bushing running coaxially with the cylinder housing and being guided out of the cylinder housing in a fluid-tight manner on the side of the working chamber, and the working linkage has a supporting ring with a diameter larger than an inside diameter of the bushing, such that a force can be transmitted to the supporting ring by the piston; and an actuating linkage guided in the bushing, to be movable relative to the working linkage so that a force can be introduced into the working linkage without a force being simultaneously transmitted to the piston.

2. The fluid-mechanical actuator according to claim 1, wherein the working linkage is connected to a trunk piston of a master brake cylinder in a vehicle brake piston of a master brake cylinder in a vehicle brake system, such that a brake pressure is generated to be passed on to wheel brakes by applying a pressure in the working chamber or a force on the actuating linkage in the master brake cylinder.

3. The fluid-mechanical actuator according to claim 1, wherein input variables are fed to a control unit, such that a value for a desired pressure in the working chamber is determined in the control unit, and a control valve is operatively arranged to be actuated by the control unit and is located in a fluid connection between a pressure source and the working chamber to set the desired pressure in the working chamber.

4. The fluid-mechanical actuator according to claim 3, wherein the working linkage is connected to a trunk piston of a master brake cylinder in a vehicle brake system, such that a brake pressure is generated to be passed on to wheel brakes by applying a pressure in the working chamber or a force on the actuating linkage in the master brake cylinder.

5. The fluid-mechanical actuator according to claim 3, wherein a signal representative of a brake pedal actuation is fed from a sensor to the control unit, and the pressure in the working chamber is controlled as a function of the brake pedal actuation.

6. The fluid-mechanical actuator according to claim 5, wherein the working linkage is connected to a trunk piston of a master brake cylinder in a vehicle brake system, such that a brake pressure is generated to be passed on to wheel brakes by applying a pressure in the working chamber or a force on the actuating linkage in the master brake cylinder.

7. The fluid-mechanical actuator according to claim 1, wherein a hollow tube is arranged on an actuating-linkage side of the cylinder housing to extend coaxially therewith, a guide ring is guided movably in the hollow tube and is connected to the actuating linkage, the guide ring being arranged between the hollow tube and the actuating linkage, and being displaceable counter to the effect of a spring in a direction of the working chamber by introducing an actuating force into the actuating linkage.

8. The fluid-mechanical actuator according to claim 7, wherein the connection between the guide ring and the actuating linkage is a switchable, non-positive connection configured to be interrupted at least when the force acting on the piston from the working chamber is greater than a force determined in accordance with a predetermined relation from the actuating force, and produced when the force acting on the piston from the working chamber is smaller than the force determined in accordance with a predetermined relation from the actuating force.

9. The fluid-mechanical actuator according to claim 8, wherein the non-positive connection between the guide ring and the actuating linkage is automatically switchable.

10. The fluid-mechanical actuator according to claim 9, wherein the guide ring has a receptacle receiving a catch spring and a pawl arranged to be acted upon by the catch spring in the direction of the actuating linkage, a catch groove, located opposite in a rest position of the pawl, being formed on the actuating linkage, whereby the engagement of the pawl in the catch groove produces the non-positive connection between the guide ring and the actuating linkage, and the pawl has a control cam, whereby the pawl is arranged to be acted upon at the control cam by a control wedge, molded onto the bushing, with release of the non-positive connection between the guide ring and the actuating linkage counter to the effect of the catch spring.

11. The fluid-mechanical actuator according to claim 1, wherein the working linkage has a receiving bolt which is guided in the bushing and whose outside diameter corresponds substantially to an inside diameter of the bushing, the receiving bolt having on its end facing the actuating linkage a centering depression which widens conically outwards, with a centering cone having an inverse corresponds shape to the centering depression being formed on the actuating linkage.

* * * * *